United States Patent

Meinema

[11] 4,085,356
[45] Apr. 18, 1978

[54] SPEED CONTROL SYSTEM FOR MODEL RAILROADS

[76] Inventor: Herbert E. Meinema, 2231 Holly Ave., Escondido, Calif. 92027

[21] Appl. No.: 638,503

[22] Filed: Dec. 8, 1975

[51] Int. Cl.² ............................................. H02P 1/04
[52] U.S. Cl. ................................... 318/331; 318/387
[58] Field of Search ............... 318/331, 336, 339, 340, 318/343, 345, 363, 386, 387–389, 410, 411, 416, 258, 270, 274, 163; 246/182 R, 182 B, 187 R, 187 A, 187 B; 46/260, 261; 104/147 A, 152, 153, DIG. 1

[56] References Cited

U.S. PATENT DOCUMENTS

| | | | |
|---|---|---|---|
| 2,974,268 | 3/1961 | Blake et al. | 318/270 |
| 3,064,174 | 11/1962 | Dinger | 318/345 CA |
| 3,838,324 | 9/1974 | Watanabe | 318/331 |
| 3,909,686 | 9/1975 | Brodhag et al. | 318/163 |

*Primary Examiner*—B. Dobeck
*Assistant Examiner*—Michael K. Mutter
*Attorney, Agent, or Firm*—Laurence R. Brown

[57] ABSTRACT

The armature of the model electric locomotive motor is connected as one arm of a bridge circuit having a D.C. supply voltage. When the armature is held to prevent rotation, the bridge is balanced by means of resistors in the other arms so that no voltage appears across the output. When the armature then rotates the voltage across the bridge output is the back EMF produced by the rotation of the armature. A variable reference voltage obtained from the same D.C. power source is introduced opposing the back EMF and the resultant is used to control the current between the power supply and the bridge. The armature back EMF is thereby held by the bridge balance essentially equal to the reference voltage and if a heavy load is applied to the armature shaft the resultant bridge unbalance will retain the desired armature rotational speed constant irrespective of load changes, but variable directly with the applied reference voltage.

Acceleration control is achieved by introducing a capacitor-resistor circuit in the output of the reference voltage circuit to simulate the acceleration performance in railroad trains. Braking control is achieved by an additional transistor-capacitance-resistor circuit added to cause a controlled deceleration rate when the reference voltage is set back to zero thus simulating the actual braking effect in train air brake systems.

2 Claims, 2 Drawing Figures

SPEED CONTROL SYSTEM FOR MODEL RAILROADS

This invention relates to railroad locomotive speed and braking control devices and more particularly to power supplies which regulate the speed and rate of acceleration and deceleration of model railway locomotives and similar devices.

BACKGROUND OF THE INVENTION

Power supplies such as batteries or transformer rectifier systems with associated means to control the power supplied to the motor of model railway locomotives are well known. In their simplest forms they consist of a source of electrical energy which supplies current to the motor through a variable resistance in order to regulate the speed. This means of controlling speed however is very poor as it is essentially a constant current device. Increasing loads on the motor reduce its speed for a given speed setting and inasmuch as the frictional effects of motor brushes, bearings and gears are a large erratic load at low speeds it is almost impossible to run such devices slowly.

A better method of control is to use a variable ratio or autotransformer to supply the energy to the motor. This holds a constant voltage to the motor and as the load increases the motor torque also rises. Other systems such as shown in U.S. Pat. Nos. 3,855,511 or 3,422,331, control the armature current as a function of load. These basic control methods are used in such power supplies today. Slow speed operation is still very poor in model railway systems using such speed controls, however, due to the highly erratic frictional loads which predominate at low armature speeds. Furthermore, acceleration, deceleration and braking conditions are not available to simulate action of trains.

Braking has been accomplished in prior art transistorized model locomotive power supplies by connecting a resistor and large capacitor in the armature current supply circuit, so that the charge is drained off the capacitor thereby slowing the motor speed when the current supply is switched off. However, this type of braking is not the same as in standard railroad practice, where air is admitted to the brake cylinders by means of a hand valve and the longer the valve is held open, the greater the braking effect. Thus, if the valve were to be held open the brakes would soon lock the wheels.

OBJECTS OF THE INVENTION

It is therefore a general object of this invention to provide an improved power supply to operate model railroad equipment.

A more specific object of the invention is to provide a power supply system which overcomes the erratic frictional problems which are encountered in low speed operation of small motors.

Another object of the invention is to provide a braking or deceleration system which is representative of standard railroad systems.

Another object of the invention is to provide a power supply which is simple and economical to manufacture.

Another object of the invention is to provide a power supply which enables one to operate model railroad equipment much like that of regular prototypes.

BRIEF DESCRIPTION OF THE INVENTION

Thus in accordance with this invention, a source of direct current energy is connected to a control system consisting of an armature current regulating power transistor which regulates the amount of current fed to a balanced bridge circuit. One leg of this bridge comprises the motor armature. The bridge is balanced with the armature restricted from rotating. When the armature is now allowed to rotate the voltage now appearing across the bridge output is in effect the counter EMF produced by the rotation of the armature, a direct measure of the rotational velocity. The counter EMF thus developed is used in conjunction with a variable speed control reference voltage to control the armature velocity by applying the resultant voltage to a speed control transistor regulating power supply current. Any EMF reference voltage established in the bridge causes the power transistor to conduct current from the supply. The armature then begins to rotate and increases its velocity until the counter EMF thus developed approximates that of the reference voltage. If a heavy load is applied to the armature its speed tends to drop thus reducing the counter EMF. This causes the series power transistor to become more conductive and so supply more power to the armature so that it rotates faster. Thus the armature tends to operate at the speed determined by the reference voltage and varying loads have little effect.

A large capacitor connected in the transistor circuit will affect the current decay and buildup when the speed control setting is changed. Acceleration control settings provide for choice of a realistic increase of speed with different throttle settings. Similarly provided are braking and deceleration controls for discharge of the capacitor.

THE DRAWING

DETAILED DESCRIPTION OF THE INVENTION

Figure 1:
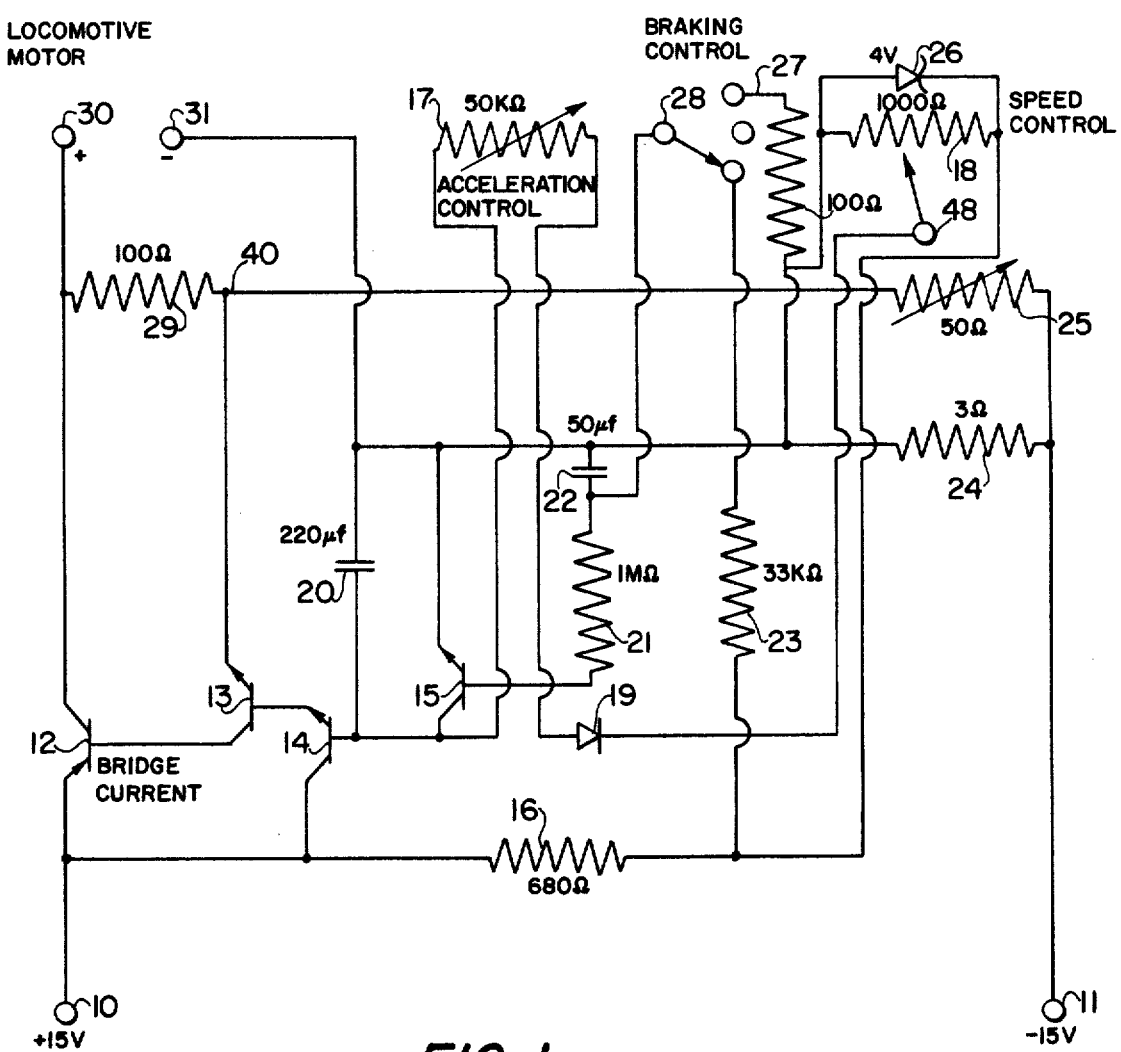
FIG. 1 is a schematic drawing of the circuit for the invention.

In FIG. 1, terminals 10 and 11 are connected to a source of direct current, 10 being the positive terminal and 11 the negative. The applied potential is of the order of twelve to sixteen volts. A fifteen watt PNP transistor 12 controls current flow from the source. A two stage amplifier includes a medium power NPN transistor 13 which controls the base current of current transistor 12 and medium power NPN transistor 14 which is coupled as an emitter follower for input voltage signals. Still another medium power NPN transistor 15 is used to drain the stored charge across capacitor 20. A voltage divider network in one bridge arm can be traced through resistors 16 and 18 from terminals 10 to 31. Reference voltage is supplied from the arm of potentiometer resistor 18 to the base of transistor 14. The reference voltage is supplied through diode 19. Current limiting resistor 21 and electrolytic capacitor 22 are used to hold a charge established by switch 28 and resistor 23. Resistors 24 and 25 constitute two legs of the bridge circuit which can be balanced by variable resistor 25. Zener diode 26 holds a fixed potential across reference voltage speed control potentiometer 18. Braking control switch 28 selects several positions. One through resistor 27 limits the current when capacitor 22 is discharged. Resistor 23 is used to charge capacitor 22. Resistor 29 is used as one arm of the bridge circuit and terminals 30 and 31 across which the locomotive motor armature is connected provides a fourth bridge arm.

Figure 2:
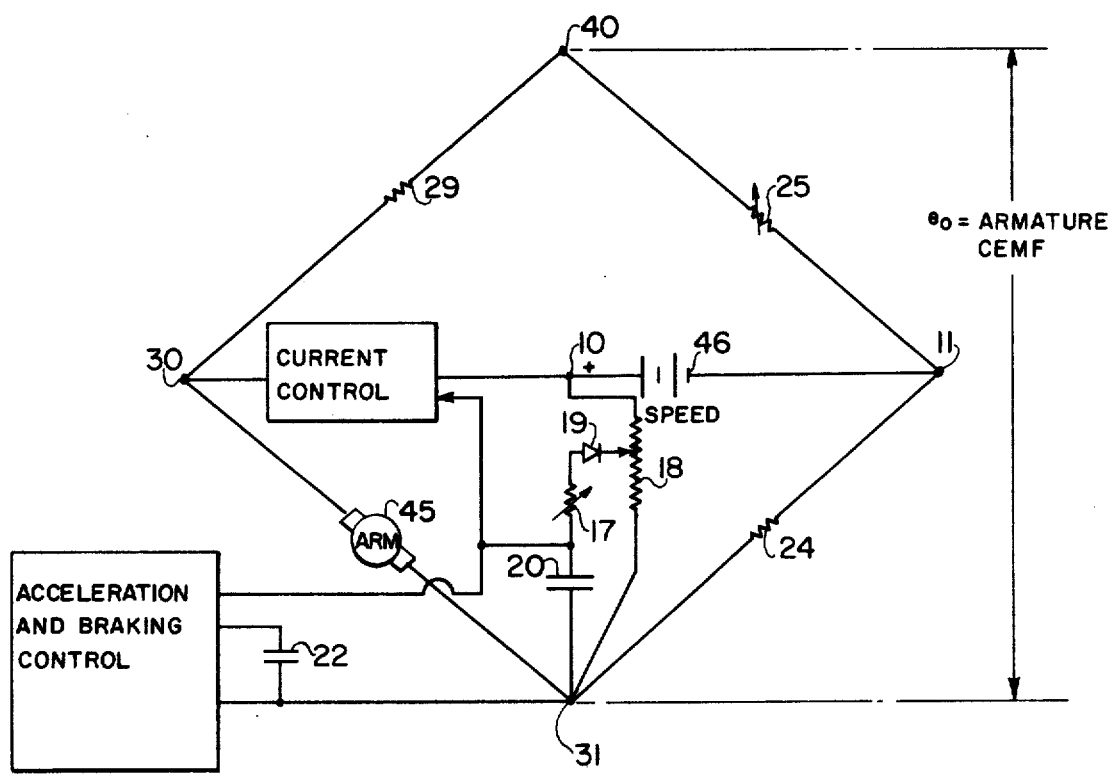
FIG. 2 is a simplified equivalent circuit diagram.

A simplified bridge circuit arrangement is illustrated in FIG. 2, which uses similar reference characters to provide comparison with the complete circuit of FIG. 1.

THE OPERATIONAL MODE

When the armature 45 of the motor to be controlled is connected across terminals 30 and 31 it becomes part of a bridge circuit comprising resistors 24, 25 and 29. In this configuration the bridge is balanced when the ratio of the armature resistance to the series resistance 24 is the same as the ratio of resistance 29 to resistance 25. Therefore regardless of the voltage applied across terminals 10 and 11 the voltage existing between terminals 31 and 40 hereafter referred to as the bridge output, will always be zero if the armature is constrained from rotating. When the armature is allowed to rotate a voltage will appear across the bridge output. This is known as the counter electromotive force (CEMF) and is due to the armature coils cutting the magnetic flux existing in the motor field. This potential is proportional to armature rotational speed.

In this invention the voltage developed by the armature is compared to a reference voltage obtained from a voltage divider between terminals 10 and 31, thereby to use a single power source such as battery 46. The resultant differential voltage developed at lead 48 is amplified and applied to the base of transistor 12 in such polarity as to cause an increase in current supplied to the bridge and therefore the armature as its rotational velocity tends to decrease because of increased load.

The reference voltage is obtained from the movable arm of potentiometer 18, which is shunted by a four volt Zener diode to hold a constant voltage, and which is supplied through a current limiting resistor 16 from the current source connected between terminals 10 and 11.

The potentiometer is connected to the bridge junction of terminal 31 and resistor 24. The junction 31 is one terminal of the bridge output circuit the other terminal being the junction 40 of resistors 25 and 29. The bridge output voltage with the armature rotating is negative at terminal 31 with respect to that at the junction of resistors 25 and 29.

In operation the arm of potentiometer 18 is moved so that the positive voltage thus provided is applied through diode 19 and resistance 17 to the base of transistor 14. This causes the voltage on the emitter of transistor 14 to be positive and because the emitter of 14 is connected directly to the base of transistor 13 causes the base of transistor 13 also to become positive with respect to its emitter thus causing current to flow in the collector circuit of transistor 13. The collector of transistor 13 is directly connected to the base of power transistor 12 and so causes the base of 12 to become negative with respect to its emitter. This causes 12 to become conductive and supply current to the bridge circuit causing the armature to rotate. The resultant counter electromotive force being in series opposition to the established reference voltage causes less current to flow in transistor 12 and thus limits the speed of the motor armature to the extent that the back electromotive force approximates the reference voltage. If a large external load is now applied to the armature shaft reducing its speed the back electromotive force decreases, the differential voltage with respect to the reference voltage increases and the current through transistor 12 increases thus supplying more current to the armature and so causing its speed to hold approximately constant. As a result the armature speed tends to hold the speed established by the reference voltage irrespective of load.

Another feature of this invention is the novel motor deceleration or braking circuit. The reference voltage established by means of potentiometer 18 is applied through diode 19 and resistor 17 to the base of transistor 14. Capacitor 20 is connected between the base of transistor 14 and the terminal 31. If the reference voltage is decreased by moving the arm of potentiometer 18, diode 19 becomes nonconductive and the voltage previously established across capacitor 20 tends to remain as it was. The armature therefore will continue to rotate at the speed previously established by the reference voltage until the charge across capacitor 20 slowly decreases either by its own leakage resistance or other external means.

In this invention auxiliary means are provided to decrease the charge across capacitor 20 to simulate the actual braking means in prototype railroad operation. Capacitor discharge transistor 15 is connected across capacitor 20, the emitter to the junction of terminal 31 and resistor 24 and the collector to the base of transistor 14. The base of transistor 15 is connected through current limiting resistor 21 to capacitor 22. Capacitor 22 is charged or discharged by means of switch 28. When the arm of switch 28 connects to resistor 27 any charge across capacitor 22 is removed and transistor 15 is nonconductive. Thus the charge across capacitor 20 remains essentially constant with the result that the armature speed remains constant. If the arm of switch 28 connects to resistor 23 a charge is built up across capacitor 22 and the resultant voltage applied through current limiting resistor 21 to the base of transistor 15. Transistor 15 now becomes conductive and the collector current slowly drains off the charge across capacitor 20 causing the armature speed to decrease.

The longer the arm of switch 28 is connected to resistor 23 the greater the collector current in transistor 15 and the more rapid the rate at which the charge is removed from capacitor 20. This is similar to the locomotive engineer's throttle valve in end result. If at any time the arm of switch 28 is placed in the center position and thus disconnected, the collector current of transistor 15 will no longer change but remain constant and thus discharge capacitor 20 at a constant rate thus causing the armature speed deceleration rate to remain constant. If the arm of switch 28 is connected to resistor 27 the charge across capacitor 22 will be removed, transistor 15 will become nonconductive, the charge across capacitor 20 will remain constant and the armature speed will stay constant. Thus any degree of deceleration rate can be produced by properly positioning the switch.

Variable resistor 17 regulates the rate at which capacitor 20 is charged and therefore the rate at which the armature speed accelerates.

While I have shown and described the preferred embodiments of my invention, it will be apparent that numerous variations and modifications thereof may be made without departing from the underlying principles of the invention. I therefore desire by the following claims, to include within the scope of the invention all such variations and modifications by which substantially the results of my invention may be obtained through the use of substantially the same or equivalent means.

What is claimed is:

1. A current supply for model railroads having a driving motor connected for receiving current therefrom which comprises a continuous DC speed control circuit controlling the armature current as a function of the counter electromotive force developed by rotation of the driving motor armature thereby to regulate the armature rotational speed, comparison means in which said counter electromotive force is compared to a speed control reference voltage of predetermined magnitude derived by a voltage divider across a DC supply, means controlling the current supplied to the motor armature with the resultant differential voltage, storage capacitor means for retaining a charge proportional to the reference voltage and switching means selectively controlling the charge and discharge of said capacitor means to simulate braking and acceleration.

2. A current supply for model railroads having a driving motor connected for receiving current therefrom which comprises a continuous DC speed control circuit controlling the armature current as a function of the counter electromotive force developed by the rotation of the driving motor armature thereby to regulate the armature rotational speed having a control for increasing or reducing said current to said amature, a capacitor connected to retain and control current from a source for supply to said armature after said control is operated to reduce current, said capacitor connected for charging when said current is increasing to thereby effect acceleration control for the speed of said armature.

* * * * *